United States Patent
Sano et al.

(10) Patent No.: US 10,410,070 B2
(45) Date of Patent: *Sep. 10, 2019

(54) STEP DETECTION DEVICE AND STEP DETECTION METHOD

(71) Applicant: Nissan Motor Co., Ltd., Yokohama-shi, Kanagawa (JP)

(72) Inventors: Yasuhito Sano, Kanagawa (JP); Takura Yanagi, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/749,867

(22) PCT Filed: Aug. 4, 2015

(86) PCT No.: PCT/JP2015/072085
§ 371 (c)(1),
(2) Date: Feb. 2, 2018

(87) PCT Pub. No.: WO2017/022080
PCT Pub. Date: Feb. 9, 2017

(65) Prior Publication Data
US 2018/0225525 A1 Aug. 9, 2018

(51) Int. Cl.
*G06K 9/00* (2006.01)
*G06T 7/285* (2017.01)
(Continued)

(52) U.S. Cl.
CPC .......... *G06K 9/00798* (2013.01); *G01B 11/24* (2013.01); *G06K 9/00805* (2013.01);
(Continued)

(58) Field of Classification Search
CPC ............ G06K 9/00805; G06K 9/00798; G06T 2207/30261; G06T 2207/10021;
(Continued)

(56) References Cited

U.S. PATENT DOCUMENTS

| 6,845,172 | B2 * | 1/2005 | Furusho | G05D 1/0246 348/113 |
| 7,054,467 | B1 * | 5/2006 | Honda | G01S 3/784 382/104 |
| 9,676,330 | B2 | 6/2017 | Takemae et al. | |
| 2004/0098196 | A1 | 5/2004 | Sekiguchi | |

(Continued)

FOREIGN PATENT DOCUMENTS

JP 2004098717 A 4/2004
JP 2009053818 A 3/2009
(Continued)

OTHER PUBLICATIONS

C. Fernández, D. F. Llorca, C. Stiller and M. A. Sotelo, "Curvature-based curb detection method in urban environments using stereo and laser," 2015 IEEE Intelligent Vehicles Symposium (IV), Seoul, 2015, pp. 579-584.*

(Continued)

*Primary Examiner* — Shaghayegh Azima
(74) *Attorney, Agent, or Firm* — Young Basile Hanlon & MacFarlane, P.C.

(57) ABSTRACT

A step detection device, including a distance measurement unit which detects the height of the road surface around a vehicle, approximates with a curve, the gradient of the road surface in a travelable region in the vehicle width direction, based on the height of the road surface, and detects a step on the road surface, based on the agreement degree of the height of a measurement point relative to the curve and the agreement degree of the height of a measurement point relative to a curve with which the gradient of the road surface in an extended region defined by extending the travelable region in the vehicle width direction is approximated.

7 Claims, 8 Drawing Sheets

(51) Int. Cl.
*G06T 7/593* (2017.01)
*H04N 13/207* (2018.01)
*G01B 11/24* (2006.01)
*G06T 7/70* (2017.01)
*H04N 13/239* (2018.01)
*G08G 1/16* (2006.01)
*G06T 7/521* (2017.01)
*H04N 13/00* (2018.01)

(52) U.S. Cl.
CPC .............. *G06T 7/285* (2017.01); *G06T 7/593* (2017.01); *G06T 7/70* (2017.01); *H04N 13/207* (2018.05); *H04N 13/239* (2018.05); *G06T 7/521* (2017.01); *G06T 2207/10021* (2013.01); *G06T 2207/30256* (2013.01); *G06T 2207/30261* (2013.01); *G08G 1/165* (2013.01); *H04N 2013/0081* (2013.01)

(58) Field of Classification Search
CPC ........... G06T 7/593; G06T 2207/30256; G06T 7/285; G06T 7/50; G06T 7/521; G08G 1/165; H04N 2013/0081; H04N 13/207; G01B 11/22
See application file for complete search history.

(56) References Cited

U.S. PATENT DOCUMENTS

| | | | | |
|---|---|---|---|---|
| 2008/0055192 | A1* | 3/2008 | Nagano | G02B 27/01 345/7 |
| 2009/0052742 | A1 | 2/2009 | Okamoto | |
| 2011/0222732 | A1* | 9/2011 | Higuchi | B60W 30/14 382/104 |
| 2015/0165972 | A1* | 6/2015 | Takemae | G06K 9/00805 348/148 |
| 2015/0334269 | A1* | 11/2015 | Yokota | H04N 5/232 382/103 |
| 2016/0304098 | A1* | 10/2016 | Ito | G06T 7/593 |

FOREIGN PATENT DOCUMENTS

| | | |
|---|---|---|
| JP | 2013205130 A | 10/2013 |
| JP | 2014002608 A | 1/2014 |
| JP | 2016043700 A | 4/2016 |

OTHER PUBLICATIONS

Fernández C. et al., "Curvature-based Curb Detection Method in Urban Environments using Stereo and Laser", 2015 IEEE Intelligent Vehicles Symposium (IV), Jun. 28, 2015, pp. 579-584.

* cited by examiner

STEP DETECTION DEVICE AND STEP DETECTION METHOD

TECHNICAL FIELD

The present invention relates to a step detection device and a step detection method for detecting a step on a road surface.

BACKGROUND

There has been known a roadside object detection apparatus which detects height information on a road surface from camera images and detects a step on the road surface formed by roadside objects, such as a curb, from the height information (see Japanese Patent Application Publication No. 2014-002608).

The foregoing roadside object detection apparatus recognizes that there is a step when the amount of a height change of the road surface is larger than or equal to a threshold. In the case where the roadway has a gradient, the height of the road surface is different depending on the position of the roadway, so that the amount of a height change of the road surface cannot be detected accurately in some cases depending on how to set positions on the roadway.

SUMMARY

The present invention has been made in view of the above problem, and an object thereof is to provide a step detection device and a step detection method which are capable of detecting the position of a step on a road surface accurately even if the roadway has a gradient.

A step detection device according to an aspect of the present invention includes a distance measurement unit which detects the height of the road surface around a vehicle, approximates with a curve, the gradient of the road surface in a travelable region in the vehicle width direction, based on the height of the road surface, and detects a step on the road surface, based on the agreement degree of the height of a measurement point relative to the curve and the agreement degree of the height of a measurement point relative to a curve with which the gradient of the road surface in an extended region defined by extending the travelable region in the vehicle width direction is approximated.

The aspect of the present invention is capable of detecting a steep height change of the road surface, or a step, from the agreement degree of the measurement point relative to the curve. Thus, it is possible to detect the position of the step on the road surface accurately even if the roadway has a gradient.

DETAILED DESCRIPTION OF THE EMBODIMENTS

First Embodiment

Next, embodiments will be described in detail with reference to the drawings.

The overall configuration of a step detection device 1 according to an embodiment will be described with reference to FIG. 1. The step detection device 1 detects the height of the surface of a road (hereinafter referred to as "a road surface") around a vehicle and approximates the gradient of the road surface with a curve. Then, the step detection device 1 detects a step on the road surface based on the agreement degree of measurement points of the road surface relative to the approximate curve.

Specifically, the step detection device 1 includes a distance sensor 12 for detecting the height of the road surface around a vehicle and a microcomputer 13 for executing a series of information processing to detect a step on the road surface from height data of measurement points measured by the distance sensor 12.

An example of the distance sensor 12 is a stereo camera which shoots objects around a vehicle from multiple different directions simultaneously and thus can store also information in the depth direction (distances from the sensor 12) of the objects around the vehicle. By performing certain image processing on the stereo images obtained by the stereo camera, it is possible to acquire three-dimensional information on an object image appearing on the stereo images of an object around the vehicle. The objects around the vehicle include a road and a curb. The details will be described later.

The microcomputer 13 includes, for example, a general-purpose microcontroller equipped with a CPU, memory, and input-output unit and serves as multiple information processing circuits included in the step detection device by executing a preinstalled computer program. The microcomputer 13 repeatedly executes at predetermined time intervals, a series of information processing cycles to detect a step on the road surface from the measurement data acquired by the distance sensor 12. The microcomputer 13 may also be used as an electronic control unit (ECU) used for other control of the vehicle.

The multiple information processing circuits which the microcomputer 13 serves as includes an arithmetic circuit 14, a step determination position circuit 15, a travelable region circuit 16, a road surface gradient circuit 17, and a step detection circuit 18.

The arithmetic circuit 14 constitutes a distance measurement unit 11 together with the distance sensor 12, and performs, from stereo images obtained by the stereo camera, a series of stereo image processing to acquire three-dimensional information on object images appearing on the stereo images of objects around the vehicle.

For example, the arithmetic circuit 14 performs lens distortion correction processing for correcting distortion of stereo images caused by the lenses and performs parallelism correction processing for correcting the vertical position between stereo images (processing to make stereo images parallel and the same height). Then, the arithmetic circuit 14 performs stereo matching processing for estimating the correspondence between the pixels of stereo images. This makes it possible to calculate not only the two-dimensional coordinates of an object on the imaging plane of the stereo camera but also the distance from the imaging plane of the stereo camera to the object. Thus, it is possible to detect the distance and the direction to an object around the vehicle.

The arithmetic circuit 14 further performs coordinate conversion processing and thus can acquire three-dimensional information on the objects around the vehicle on the coordinates of the distance measurement data. The three-dimensional information on the objects around the vehicle includes three-dimensional information on the road surface around the vehicle. Thus, the arithmetic circuit 14 can acquire the height data of the measurement points of the road surface around the vehicle.

The lens distortion correction processing, for example, captures a flat plate with a black-and-white checkered pattern thereon with each camera and estimates a lens distortion parameter and a camera lens center parameter which allow the lattice points of the checkered pattern to be in a lattice shape constituted of rectangles. Here, this processing may be a common method for lens distortion correction, and the present embodiment has no particular limitation.

The parallelism correction processing, for example, captures a flat plate with a black-and-white checkered pattern thereon with both cameras of a stereo camera and estimates a spatial position parameter and angle parameter between the stereo cameras which allow the positions of the lattice points of the checkered pattern on the images of both cameras to be at the same vertical positions. Here, this processing may be a common method for parallelism correction processing, and the present embodiment has no particular limitation.

The stereo matching processing, for example, calculates which pixel in the right camera image each pixel in the left camera image is associated, with respect to the left camera image. For example, the stereo matching processing calculates the absolute values of the luminance value of each pixel in the left camera image and the luminance value of each pixel in the right camera image, as evaluation values, and calculates a pixel in the right camera image, of which the evaluation value is minimum, as the associated pixel. Methods of calculating the evaluation value include, for example, a method using the sum of absolute differences (SAD) or the sum of squared differences (SSD), or a method in which the evaluation calculation area includes not only a single point of each pixel but peripheral pixels of each pixel. Here, the method for calculating evaluation values may also be another common method, and the present embodiment has no particular limitation.

Figure 2:
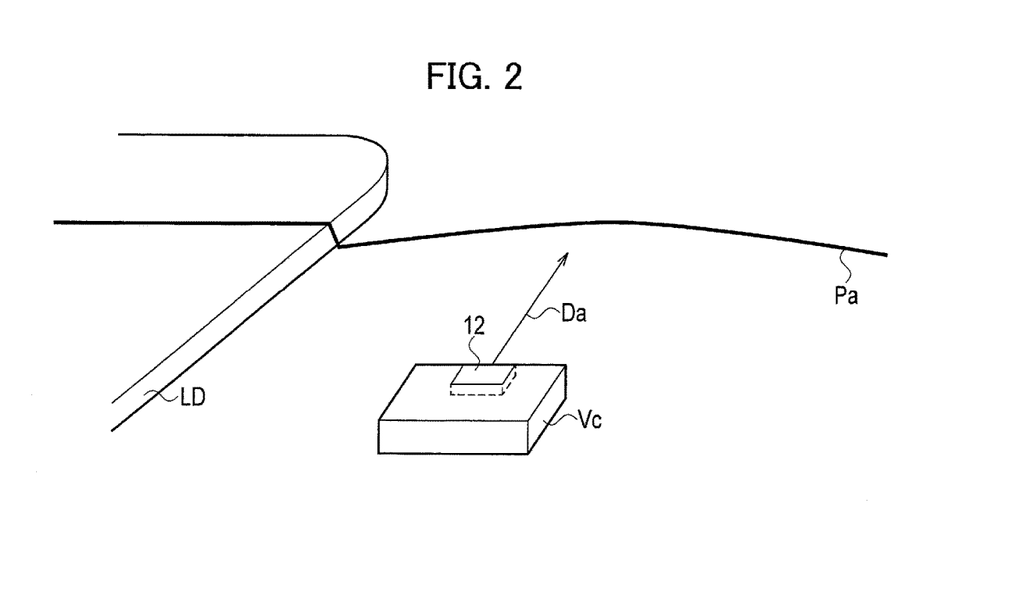
FIG. 2 is a perspective view illustrating an example of a linear step determination position (Pa) set on the road surface around a vehicle.
Figure 3:
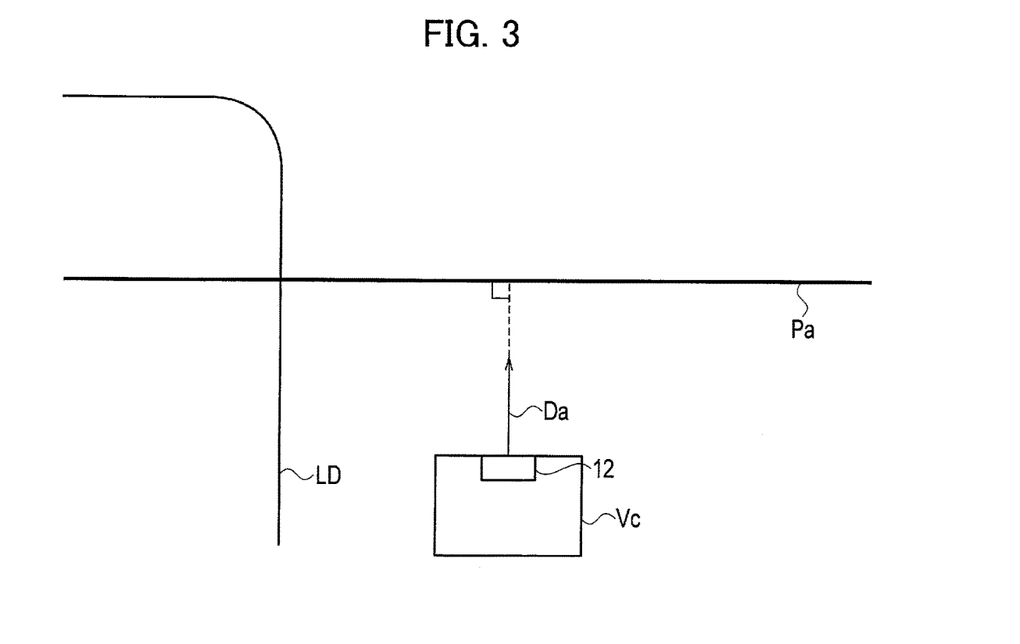
FIG. 3 is an overhead view corresponding to FIG. 2.

The step determination position circuit 15 sets a linear step determination position in the vehicle width direction on the road surface around the vehicle on the coordinates of the distance measurement data detected by the distance sensor 12. For example, as illustrated in FIGS. 2 and 3, the step determination position circuit 15 sets a step determination position (Pa), which is away from the distance sensor 12 in a first predetermined direction (Da) by a predetermined distance and extends in a direction orthogonal to the first predetermined direction (Da), on the road surface on the coordinates of the distance measurement data. FIGS. 2 and 3 illustrate an example in which the distance sensor 12 is installed in the front of a vehicle (Vc), and the first predetermined direction (Da) is set to be the traveling direction of the vehicle (Vc). Hence, the step determination position (Pa) extending in the vehicle width direction is set ahead of the vehicle (Vc) on the coordinates of the distance measurement data. Note that the step determination position (Pa) is set within the image capturing area of the stereo camera. The first predetermined direction (Da) is not limited to the traveling direction of the vehicle (Vc).

In an example illustrated in FIGS. 2 and 3, a step (LD) having a discontinuous change in the height of the road surface is formed at a road shoulder which is an end in the vehicle width direction of the roadway where the vehicle (Vc) can travel. Outside the roadway with the step (LD) as a boundary is provided a stepped portion (for example, a sidewalk or a road shoulder) the road surface of which is one step higher than the roadway. As described above, in the example illustrated in FIGS. 2 and 3, the road includes the roadway and the stepped portion (sidewalk or road shoulder), and at the boundary between the roadway and the stepped portion (sidewalk or road shoulder) is formed the step (LD). The linear step determination position (Pa) extends in a direction in which it crosses the roadway, step (LD), and stepped portion (sidewalk or road shoulder).

The positional relationship between the foregoing distance sensor 12 and the step determination position (Pa) is a mere example. Another example will be described later with reference to FIGS. 8 and 9.

Figure 4:
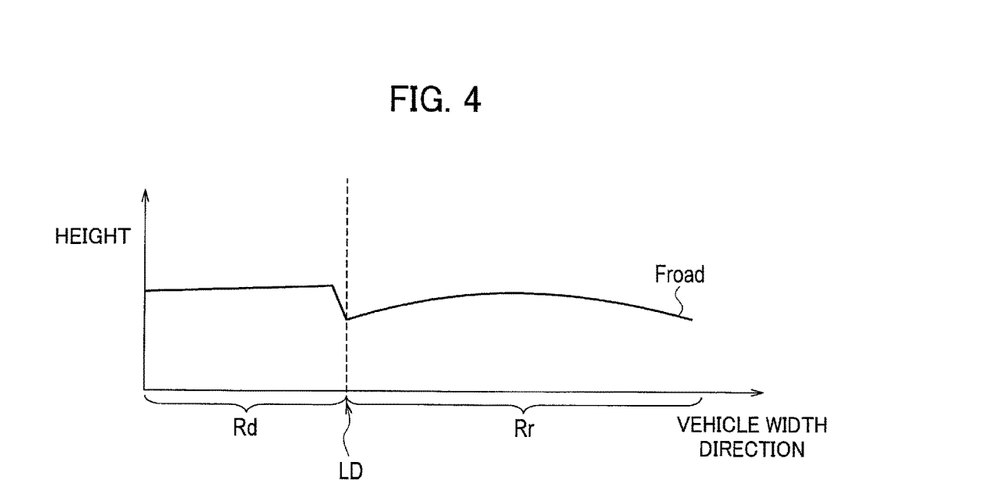
FIG. 4 is a graph illustrating a height distribution of a road surface (Froad) at the step determination position (Pa)

The step determination position circuit 15 calculates the height data distribution (distance measurement data) of the measurement points on the road surface at the step determination position (Pa), from the height of the road surface acquired by the arithmetic circuit 14. In FIG. 4, the vertical axis represents the height of the road surface (Froad), and the horizontal axis represents the step determination position (Pa) extending in the vehicle width direction.

As illustrated in FIG. 4, at the boundary between a roadway (Rr) and a stepped portion (Rd) is formed a step (LD). The road surface (Froad) of the roadway (Rr) has a gradient (cant) such that the height decreases from the center toward the road shoulders at both ends. This is a typical road design and structure to improve drainage of the roadway and prevent water from remaining on the roadway. The height of the road surface (Froad) suddenly increases at the step (LD) and the road surface (Froad) of the stepped portion (Rd) has a flat surface which is one step higher than the roadway (Rr). For example, a sidewalk or the like is formed on the stepped portion (Rd).

Figure 5:
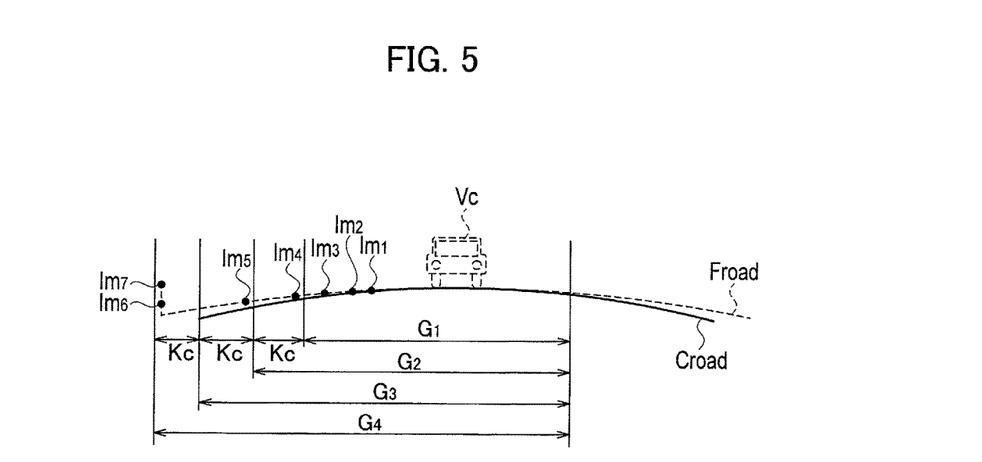
FIG. 5 is a diagram illustrating a series of processing cycles of widening stepwise a region ($G_1$ to $G_4$) of the road surface (Froad) to be approximated with a curve by a predetermined range (Kc) at every step, and judging a change in the agreement degree of measurement points ($I_{m1}$ to $I_{m7}$) relative to the curve (Croad).

The travelable region circuit 16 estimates a travelable region (G1) in the travelling direction of the vehicle (Vc) at the step determination position (Pa) based on the speed of the vehicle (Vc). The travelable region (G1) indicates a region in which the vehicle (Vc) can travel, and which excludes a boundary of the roadway, for example, a step. As illustrated in FIG. 5, the travelable region circuit 16 estimates a region including the width of the vehicle (Vc) and a predetermined travel margin region added thereto as the travelable region (G1) in the traveling direction of the vehicle (Vc).

The predetermined travel margin region varies depending of the speed of the vehicle. The higher the speed of the vehicle (Vc) in the traveling direction is, the wider predetermined travel margin region can be set. In other words, the higher the speed of the vehicle (Vc) in the traveling direction is, the wider the travelable region circuit 16 can estimate the travelable region (G1) in the vehicle width direction. Note that the speed of vehicle (Vc) can be obtained by means of vehicle speed information or wheel speed pulse information through CAN, or by continuously acquiring vehicle position information using a GPS.

As an example, if the vehicle is traveling at 70 km/hour, the travelable region circuit 16 judges that the vehicle is traveling on a trunk road, and sets a travelable region with a width of 8 m. If the vehicle is travelling at 20 km/hour, the travelable region circuit 16 judges that the vehicle is traveling on a narrow street such as in a residential area, and sets a travelable region with a width of 4 m.

The road surface gradient circuit 17 approximates the gradient of the road surface (Froad) of the travelable region (G1) in the vehicle width direction with a curve, based on the height of the road surface. As for the approximate curve, for example, a quadratic curve is used. Besides, a linear curve, a spline curve, or a combination thereof can be used. Specifically, as illustrated in FIG. 5, the road surface gradient circuit 17 selects multiple measurement points (Im1, Im2, Im3) on the step determination position (Pa) in the travelable region (G1). Using the height data of the measurement points (Im1, Im2, Im3), the road surface gradient circuit 17 approximates the gradient of the road surface (Froad) of the roadway (Rr) in the vehicle width direction, with a curve (Croad). Any number and any positions can be selected for the measurement points.

Here, if the travelable region (G1) is too narrow compared to the region of the actual roadway (Rr), the distance from the end of the travelable region (G1) to the end of the roadway (Rr) (road shoulder) is long. This separates the approximate curve (Croad) from the gradient of the actual roadway (Rr), which makes it difficult to detect the step (LD) accurately. In light of the above, by widening the travelable region (G1) gradually in the vehicle width direction and repeating the curve approximation, it is possible to make the curve (Croad) close to the gradient of the actual roadway (Rr) and detect a change in the agreement degree of the measurement points relative to the curve (Croad) accurately. The agreement degree of the measurement points relative to the curve (Croad) is, for example, the deviation or the standard deviation of the measurement points relative to the curve (Croad). The smaller the deviation or the standard deviation is, the higher the agreement degree is.

Alternatively, as indicated by Formula (1), the agreement degree can be obtained using R-square error. Here, yi is a measurement point, fi is an estimate on the curve (Croad), and yav is the average of the measurement points. It can be said that the closer to 1 this value is, the higher the agreement degree is. Although the result depends on the environment, if the amount of decrease in this value (R2) exceeds 0.1, it can be judged that a step is included.

[Math. 1]

$$R^2 = 1 - \frac{\sum_i (y_i - f_i)^2}{\sum_i (y_i - y_{av})^2} \qquad (1)$$

Specifically, the road surface gradient circuit 17 curve-approximates the gradient of the road surface (Froad) in the vehicle width direction of an extended region (G2, G3, G4, . . . ), which is defined by widening the travelable region (G1) at the step determination position (Pa). The step detection circuit 18 calculates a first agreement degree of the heights of the measurement points (Im1, Im2, Im3) sets in the travelable region (G1), relative to the curve (Croad). Next, the step detection circuit 18 calculates a second agreement degree of the height data of the measurement points (Im1, Im2, . . . , Im6, Im7) set in the extended region (G2, G3, G4, . . . ), relative to the approximate curve which is an approximation of the gradient of the road surface (Froad) in the vehicle width direction of the extended region (G2, G3, G4, . . . ). Then, the step detection circuit 18 detects a step on the road surface based on the first agreement degree and the second agreement degree.

For example, the travelable region circuit 16 sets the extended region (G2) which is defined by widening the travelable region (G1) in the vehicle width direction by a predetermined range (Kc). The road surface gradient circuit 17 curve-approximates the gradient of the road surface (Froad) in the extended region (G2) in the vehicle width direction. The step detection circuit 18 calculates the agreement degree of the height data of the measurement points (Im1, Im2, Im3, Im4) relative to the curve. Similarly, the travelable region circuit 16 sets the extended region (G3) which is defined by widening the extended region (G2) in the vehicle width direction by the predetermined range (Kc). The road surface gradient circuit 17 curve-approximates the gradient of the road surface (Froad) in the extended region (G3) in the vehicle width direction, and the step detection circuit 18 calculates the agreement degree of the height data of the measurement points (Im1, Im2, Im3, Im4, Im5) relative to the curve. The step detection device 1 repeats this series of processing cycles. Then, the step detection circuit 18 judges that there is a step at a portion where the approximation error (an example of the agreement degree) between the curve and the measurement points change greatly.

The extended region (G4) includes the step (LD). The agreement degree of the height data of the measurement points (Im1~Im7) in the extended region (G4) relative to the approximate curve changes greatly compared to the previous processing cycle. This is because the predetermined range (Kc), which is the difference between the extended region (G3) and the extended region (G4), includes the measurement points (Im6, Im7) set on the step (LD). As above, the step detection circuit 18 detect a step based on the agreement degree repeatedly calculated in this series of processing cycles. The extended region for the curve approximation of the road surface is widened stepwise in the vehicle width direction by the predetermined range (Kc) at every step, and the extended region (G1 to G3) before the agreement degree decreases can be regarded as the roadway. Thus, the position of the step can be obtained accurately. Since the roadway is widely used to perform the curve approximation, it is possible to perform the step determination accurately.

Figure 1:
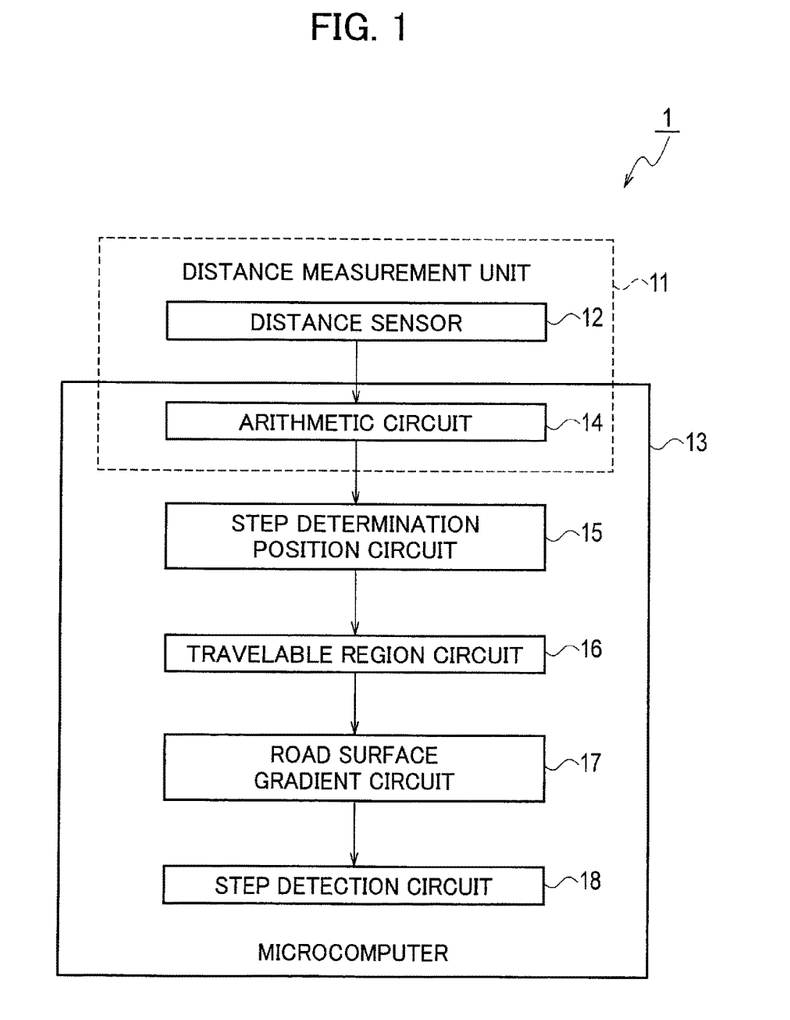
FIG. 1 is a block diagram illustrating the overall configuration of a step detection device 1 according to an embodiment.
Figure 6:
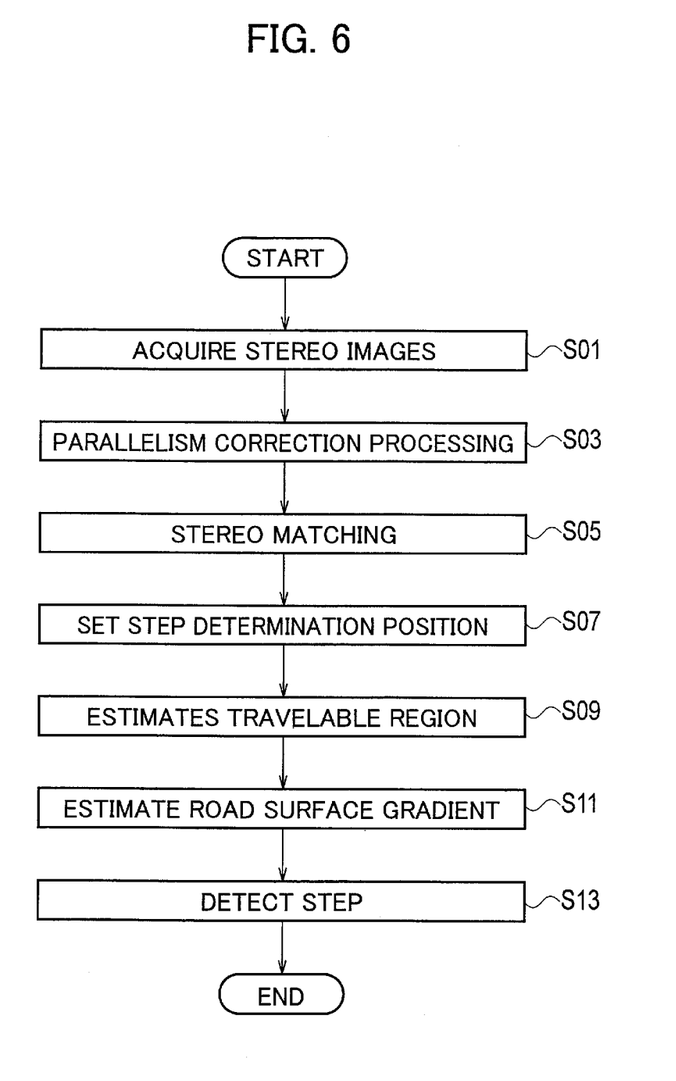
FIG. 6 is a flowchart illustrating an example of a step detection method using the step detection device 1 in FIG. 1.

With reference to FIG. 6, descriptions will be provided for an example of a step detection method using the step detection device 1 in FIG. 1. First, at step S01, stereo images are acquired using a stereo camera which is an example of the distance sensor 12.

The process proceeds to step S03, where the arithmetic circuit 14 performs lens distortion correction processing for correcting distortion of the stereo images caused by the lenses and parallelism correction processing for correcting the vertical position between stereo images. The process proceeds to step S05, where the arithmetic circuit 14 performs stereo matching processing for estimating the correspondence between the pixels of the stereo images. This makes it possible to detect the distance and the direction to an object around the vehicle. The arithmetic circuit 14 further performs coordinate conversion processing, and thus can acquires three-dimensional information on the road surface around the vehicle on the coordinates of the distance measurement data.

The process proceeds to step S07, where the step determination position circuit 15 sets the linear step determination position (Pa) extending in the vehicle width direction on the road surface around the vehicle on the coordinates of the distance measurement data detected by the distance sensor 12, for example, as illustrated in FIGS. 2 and 3. Then, the step determination position circuit 15 calculates height data (distance measurement data) of the measurement points on the road surface at the step determination position (Pa), from the three-dimensional information on the road surface acquired by the arithmetic circuit 14, as illustrated in FIG. 4.

The process proceeds to step 09, where the travelable region circuit 16 estimates a region including the width of the vehicle (Vc) and the predetermined travel margin region added thereto, as the travelable region (G1) of the vehicle (Vc) at the step determination position (Pa), as illustrated in FIG. 5.

The process proceeds to step 11, where the road surface gradient circuit 17 sets the multiple measurement points (Im1, Im2, Im3) on the step determination position (Pa) in the travelable region (G1), as illustrated in FIG. 5. Using the height data of the measurement points (Im1, Im2, Im3), the road surface gradient circuit 17 approximates the gradient of the road surface (Froad) in the height direction, with the curve (Croad). Then, the road surface gradient circuit 17 curve-approximates the gradient of the road surface (Froad) in the vehicle width direction of an extended region (G2, G3, G4, . . . ), which is defined by widening the travelable region (G1) at the step determination position (Pa).

The process proceeds to step 13, where the step detection circuit 18 calculates the first agreement degree of the height data of the measurement points (Im1, Im2, Im3) sets in the travelable region (G1), relative to the curve (Croad). Next, the step detection circuit 18 calculates a second agreement degree of the height data of the measurement points (Im1, Im2, . . . , Im6, Im7) set in the extended region (G2, G3, G4, . . . ), relative to the curve which is an approximation of the gradient of the road surface (Froad) of the extended region (G2, G3, G4, . . . ) in the vehicle width direction. Then, the step detection circuit 18 detects a step on the road surface based on the first agreement degree and the second agreement degree.

Figure 7:
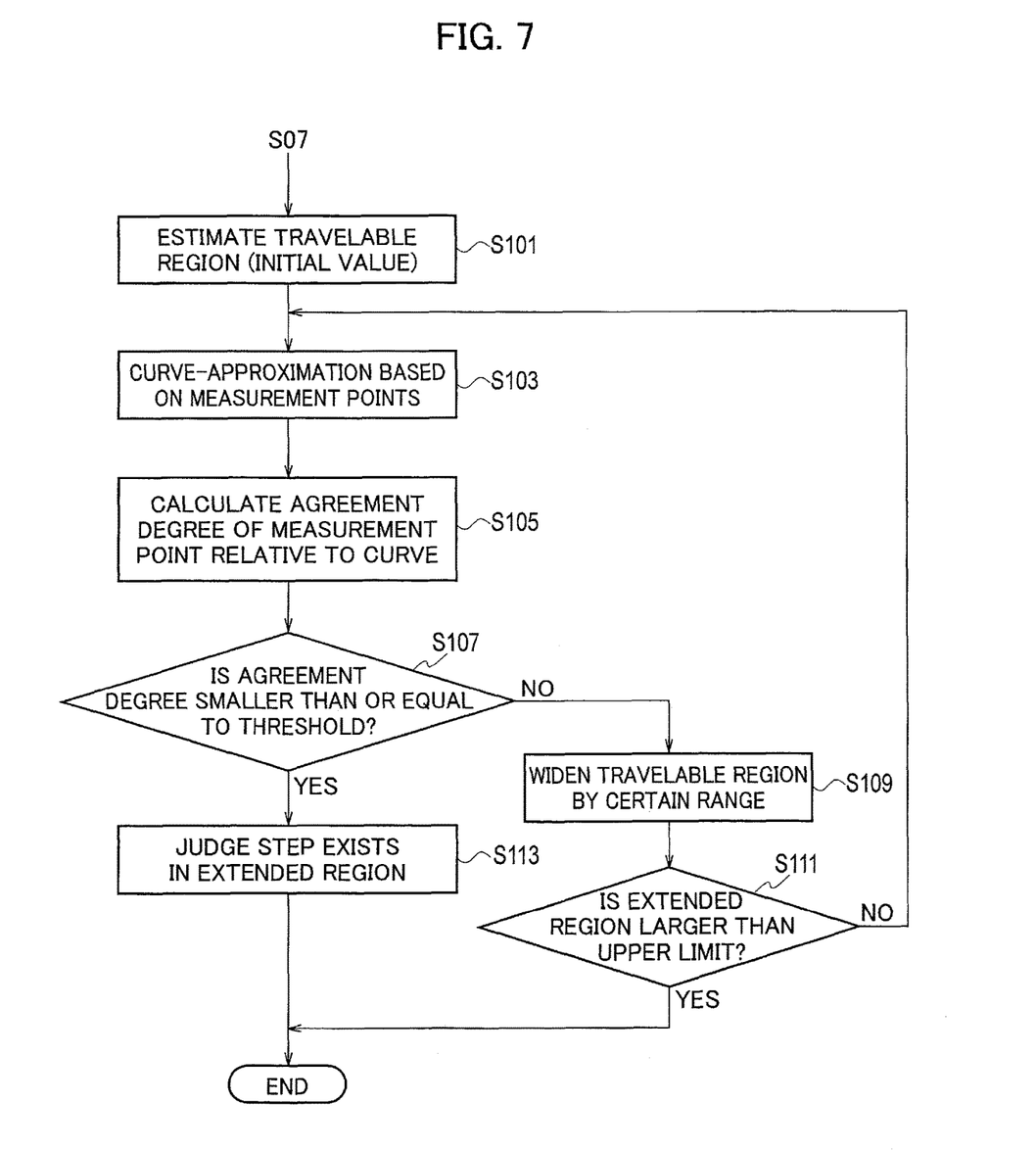
FIG. 7 is a flowchart illustrating an example of detailed procedures of steps S09 to S13 in FIG. 6.

With reference to FIG. 7, descriptions will be provided for an example of detailed procedures of steps S09 to S13 in FIG. 6. First, at step S101, the travelable region circuit 16 estimates the travelable region (G1), which is an initial value of the range in which the curve of the road surface (Froad) in the vehicle width direction is to be approximated. Next, the gradient of the road surface of the travelable region (G1) in the vehicle width direction is approximated with the curve (Croad) (S103), and the agreement degree of the heights of the measurement points (Im1, Im2, Im3) relative to the curve (Croad) is calculated (S105). The step detection circuit 18 judges whether the agreement degree is smaller than or equal to a predetermined reference value. If the agreement degree is not smaller than or equal to the predetermined reference value (NO at S107), it can be judged that the travelable region (G1) does not include a step. Accordingly, the process proceeds to step S109, where the extended region (G2) defined by widening the travelable region (G1) in the vehicle width direction by the predetermined range (Kc) is set. Note that the predetermined reference value at S107 may be set to, for example, 10 cm.

The step detection device 1 compares the extended region (G2) with an upper limit set in accordance with the width of the extended region. If the extended region (G2) is larger than the upper limit (YES at S111), detection of a step defining a road boundary is abandoned, and the process ends. If the extended region (G2) is not larger than the upper limit (NO at S111), the process returns to step S103, and steps S103 to S111 are repeated until the agreement degree becomes smaller than or equal to the predetermined reference value.

When the agreement degree becomes smaller than or equal to the predetermined reference value (YES at 107), the step detection circuit 18 judges that a step exists in the predetermined range (Kc) added at step S109 executed last (S113).

As described above, the embodiment provides the following operation and effect.

In the case where the roadway has a gradient, the height of the road surface is different depending on the position of the roadway, so that the amount of the height change of the road surface cannot be detected accurately in some cases depending on how to set positions on the roadway. As a result, if the amount of a height change of the road surface is estimated to be smaller, the step will not be detected. If the amount of a height change of the road surface is estimated to be larger, a step will be mistakenly detected. In light of the above, the gradient of the road surface in the vehicle width direction is approximated with a curve, and a step on the road surface is detected from the difference between the height of the road surface and the curve. Specifically, if the agreement degree in the extended region defined by extending the travelable region on the step determination position in the vehicle width direction changes greatly with respect to the agreement degree of the measurement points relative to the curve in the travelable region, it can be judged that a steep change in the height of the road surface, or a step, exists at a portion which was increased by the extension. Hence, even if the roadway has a gradient (cant), it is possible to detect the step on the road surface accurately.

The higher the speed of the vehicle (Vc) is, the wider the travelable region circuit 16 estimates the travelable region (G1). When the vehicle speed is high, it is presumed that the vehicle is traveling on a wide roadway, such as a highway or a trunk road. On the other hand, when the vehicle speed is low, it is presumed that the vehicle is traveling on a narrow roadway, such as in a residential area. Thus, it is possible to appropriately set a region which does not include the step (LD) and the vehicle can travel on, and thus to improve detection accuracy of the step (LD).

The step detection device 1 repeats a cycle of widening the travelable region (G1) in the vehicle width direction by the predetermined range (Kc); approximating with a curve, the gradient of the road surface (Froad) in the extended region (G2, G3, G4, . . . ) in the vehicle width direction, which was widened by the predetermined range (Kc); and calculating the agreement degree of the heights of the measurement points (Im1, Im2, . . . ) relative to the curve. The step detection circuit 18 detects a step based on the agreement degree repeatedly calculated. The extended region (G2, G3, G4, . . . ) for the curve approximation of the road surface (Froad) is widened stepwise in the vehicle width direction by the predetermined range (Kc) at every step, and the extended region (G2, G3, G4, . . . ) before the agreement degree decreases can be regarded as the roadway. Thus, the position of the step (LD) can be obtained accurately. Since the roadway is widely used to perform the curve approximation, it is possible to perform determination of the step (LD) accurately. Reducing the predetermined range (Kc) improves positional accuracy of determining the step (LD).

Although the embodiment according to the present invention have been described as above, it should not be understood that the descriptions and the drawings constituting part of this disclosure limit the present invention. This disclosure will provide various alternatives, examples, and operational techniques for those skilled in the art.

[First Modification]

Figure 8:
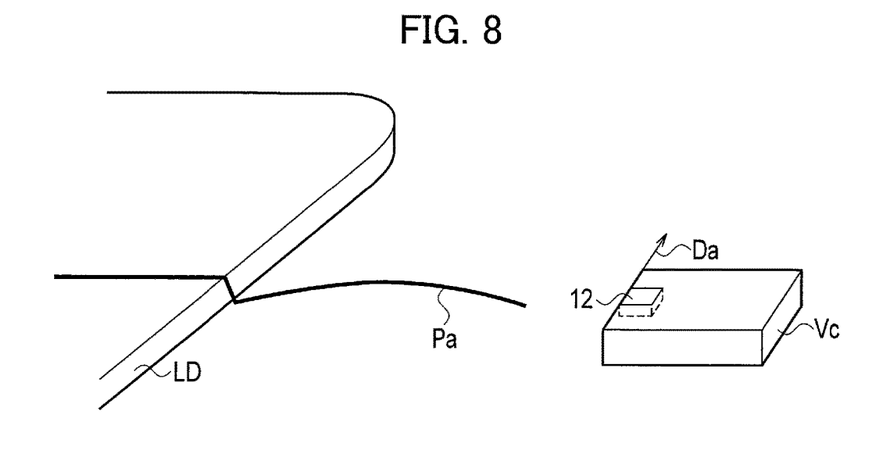
FIG. 8 is a perspective view illustrating an example of the step determination position (Pa) in the case where a stereo camera is installed on a lateral side of the vehicle (Vc)

A stereo camera as the distance sensor 12 may be installed on a lateral side of the vehicle (Vc) as illustrated in FIG. 8, instead of in the front of the vehicle (Vc), and the image capturing area of the stereo camera may be on the lateral side of the vehicle (Vc). Also in this case, the first predetermined direction (Da) is set to be the traveling direction of the vehicle (Vc). This allows the step determination position circuit 15 to set the linear step determination position (Pa) crossing the step (LD) on the road surface around (on the lateral side of) the vehicle. Specifically, it is possible to set the step determination position (Pa) which is away from the distance sensor 12 in the first predetermined direction (Da) by the predetermined distance and extends in a direction orthogonal to the first predetermined direction (Da).

[Second Modification]

Figure 9:
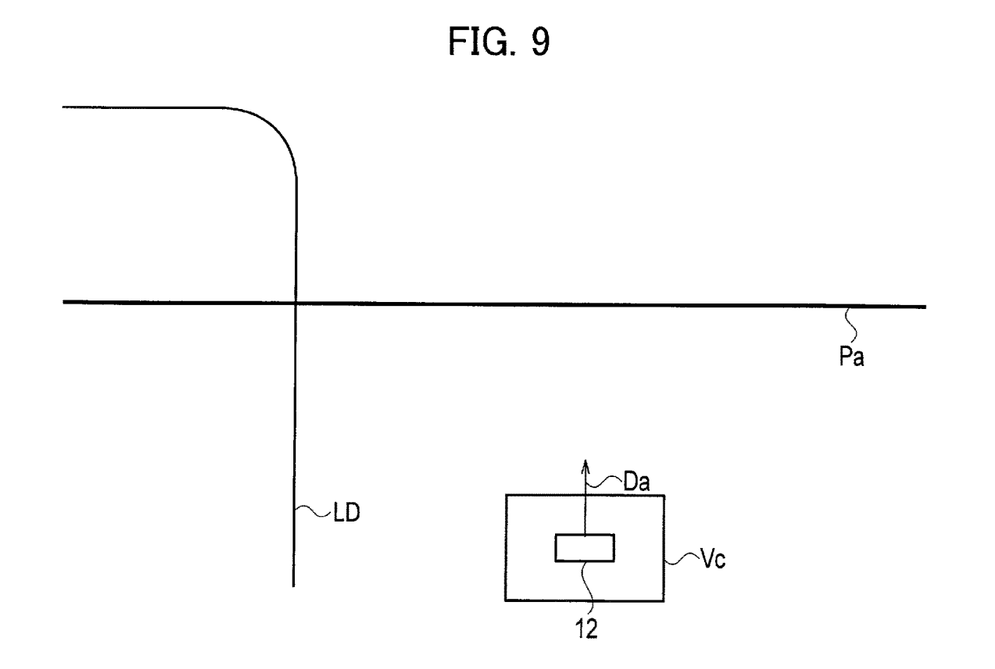
FIG. 9 is an overhead view illustrating an example of a 360-degree LRF in which an LRF (12) is installed at the center of the roof of the vehicle (Vc), and the emission range is set to be the entire circumference of the vehicle.

Another example of the distance sensor 12 is a laser rangefinder (LRF). The LRF emits laser to objects around a vehicle, and measures the returned laser reflected by the objects. Thus, the LRF measures the direction in which an object is located based on the direction in which laser is emitted and measures the distance to the object based on the time from laser emission to reception of the reflected laser. An LRF is also called a laser scanner. The emission range of an LRF can be arbitrarily set. FIG. 9 illustrates an example of a 360-degree LRF in which an LRF (12) is installed at the center of the roof of a vehicle (Vc), and the emission range is set to be the entire circumference. The step determination position circuit 15 sets the step determination position (Pa) which is away from the distance sensor 12 in the first predetermined direction (Da) by the predetermined distance and extends in a direction orthogonal to the first predetermined direction (Da). Since, similarly to the example in FIG. 2 in which the distance sensor 12 is installed in the front of the vehicle (Vc), the first predetermined direction (Da) is set to be the traveling direction of the vehicle (Vc), the step determination position (Pa) extending in the vehicle width direction is set ahead of the vehicle (Vc).

Note that by installing the LRF with a depression angle, it is possible to survey over a wide range of the vehicle traveling direction during traveling. Alternatively, a multi-layer LRF capable of emitting multiple of lasers simultaneously can be used.

Figure 10:
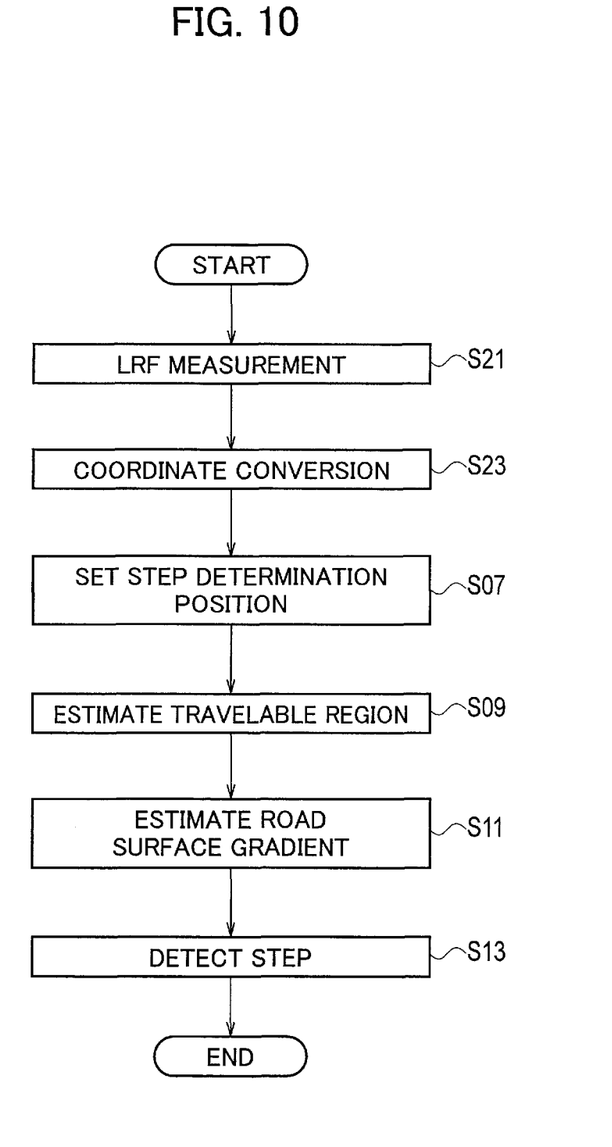
FIG. 10 is a flowchart illustrating an example of a step detection method in the case of using a laser rangefinder (LRF) as a distance sensor 12.

A step detection method using the laser rangefinder (LRF) as the distance sensor 12 is different in that steps S21 and S23 described below are executed instead of steps S01 to S05 in FIG. 6. The other steps S07 to S13 are the same as in FIG. 6, and descriptions thereof will be omitted.

At step S21, the LRF (12) measures the directions to objects to which the laser is emitted as well as the distances of the objects. Measurement data are transmitted to the arithmetic circuit 14. The process proceeds to step 23, where the arithmetic circuit 14 converts the measurement data in a polar coordinate system with the LRF (12) as the origin into data in an orthogonal coordinate system with the vehicle (Vc) as the origin. This allows the arithmetic circuit 14 to acquire three-dimensional information on the road surface around the vehicle. After that, the process proceeds to step S07.

[Third Modification]

In the embodiment, the travelable region circuit 16 determines the width of the travelable region ($G_1$) based on the speed of the vehicle (Vc). The width of the travelable region ($G_1$) can be determined not only based on the speed of the vehicle (Vc) but also using another reference. For example, the travelable region circuit 16 may determines the width of the travelable region ($G_1$) based on information on the roadway (Rr) on which the vehicle (Vc) is traveling (roadway information). For example, in order not to include the actual road boundary, it is possible to set the travelable region to be a range 1 m smaller than the width included in the roadway information.

Figure 11:
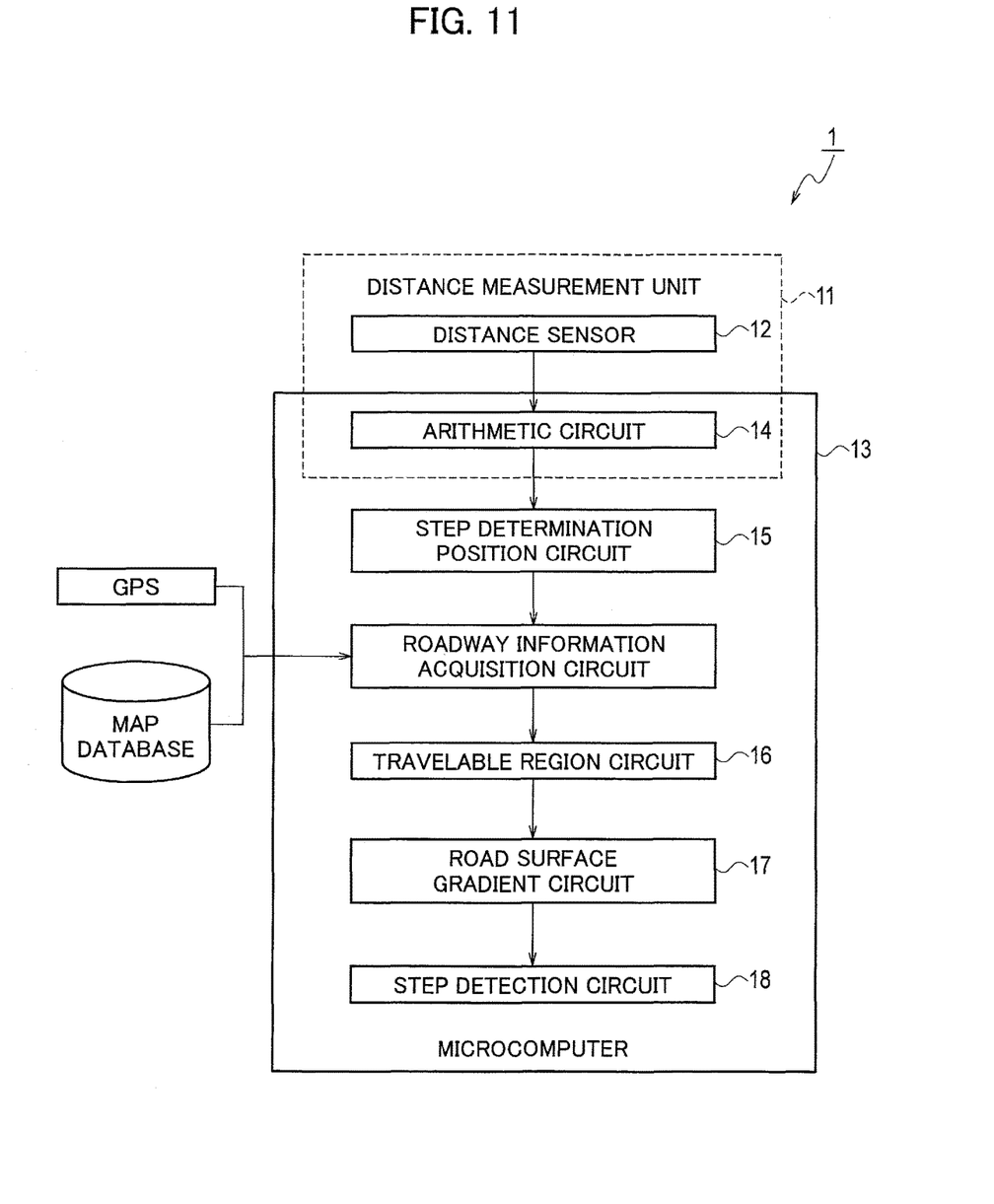
FIG. 11 is a block diagram illustrating an overall configuration of a step detection device 2 according to a third modification and a fourth modification.

As illustrated in FIG. 11, the microcomputer 13 further includes a roadway information acquisition circuit 19. The roadway information acquisition circuit 19 acquires information on the roadway (Rr), on which the vehicle (Vc) is traveling, from a GPS 20 and a map database 21. The travelable region circuit 16 can set a distance of the travelable region (G1) in the vehicle width direction based on the information on the roadway (Rr). By using the information on the roadway (Rr), it is possible to appropriately set a region which does not include the step (LD) and the vehicle (Vc) can travel on, and thus to improve detection accuracy of the step (LD).

[Fourth Modification]

The information on the roadway (Rr) acquired by the roadway information acquisition circuit 19 can be used not only as a reference of the width of the travelable region ($G_1$) but also as references for setting other parameters. For example, a step detection device 2 sets the upper limit used at S111 in FIG. 7 based on the information on the roadway (Rr). For example, in the case of LRF, the emission range is about 10 m, and thus the upper limit may be set to 10 m. If the width of the extended region is larger than the upper limit, the step detection processing may be terminated. Thus, it is possible to terminate the step detection processing in a predetermined time even for a road without a distinct step.

REFERENCE SIGNS LIST 1, 2 step detection device
11 distance measurement unit
12 distance sensor
13 microcomputer
14 arithmetic circuit
15 step determination position circuit
16 travelable region circuit
17 road surface gradient circuit
18 step detection circuit
19 roadway information acquisition circuit 20 GPS (global positioning system)
21 map database
$G_1$ travelable region
$G_2$ to $G_4$ extended region
$I_{m1}$ to $I_{m7}$ measurement point
C road curve
F road road surface
Kc predetermined range
Pa step determination position
LD step

The invention claimed is:

1. A step detection device comprising:
a distance sensor that detects a height of a road surface around a vehicle;
a travelable region circuit that estimates a travelable region in a traveling direction of the vehicle;
a road surface gradient circuit that approximates with a curve extending in a vehicle width direction, a gradient of the road surface in the vehicle width direction in the travelable region, based on the height of the road surface detected by the distance sensor; and
a step detection circuit that detects a step on the road surface, based on a difference between an agreement degree of a height of a measurement point set in the travelable region relative to the curve and an agreement degree of a height of a measurement point set in an extended region, defined by extending the travelable region in the vehicle width direction relative to the curve with which the gradient of the road surface in the extended region is approximated.

2. A step detection device according comprising:
a distance sensor that detects a height of a road surface around a vehicle;
a travelable region circuit that estimates a travelable region in a traveling direction of the vehicle;
a road surface gradient circuit that approximates with a curve, a gradient of the road surface in the travelable region in a vehicle width direction, based on the height of the road surface detected by the distance sensor; and
a step detection circuit that detects a step on the road surface, based on an agreement degree of a height of a measurement point set in the travelable region relative to the curve and an agreement degree of a height of a measurement point set in an extended region, defined by extending the travelable region in the vehicle width direction, relative to a curve with which a gradient of the road surface in the extended region is approximated,
wherein the travelable region circuit estimates the travelable region in the vehicle width direction to have a first width at a first speed and a second width at a second speed, wherein the first width is wider than the second width, and the first speed is faster than the second speed.

3. The step detection device according to claim 1, further comprising
a roadway information acquisition circuit that acquires information on a roadway on which the vehicle is travelling, wherein
the travelable region circuit sets a distance of the travelable region in the vehicle width direction based on the information on the roadway.

4. A step detection device comprising:
a distance sensor that detects a height of a road surface around a vehicle;
a travelable region circuit that estimates a travelable region in a traveling direction of the vehicle;
a road surface gradient circuit that approximates with a curve, a gradient of the road surface in the travelable region in a vehicle width direction, based on the height of the road surface detected by the distance sensor; and
a step detection circuit that detects a step on the road surface, wherein the step detection device repeats a cycle of widening the travelable region in the vehicle width direction by a predetermined range; approximating with the curve, the gradient of the road surface in the extended region that is widened by the predetermined range; and calculating an agreement degree of the height of the measurement point set in the travelable region relative to the curve, and wherein the step detection circuit detects the step based on the repeatedly calculated agreement degree.

5. The step detection device according to claim 4, further comprising
a roadway information acquisition circuit that acquires information on a roadway on which the vehicle is travelling, wherein
the step detection device sets an upper limit to a width of the extended region based on the information on the roadway.

6. A step detection method comprising:
detecting a height of a road surface around a vehicle;
estimating a travelable region in a traveling direction of the vehicle;
approximating with a curve extending in a vehicle width direction, a gradient of the road surface in the vehicle width direction in the travelable region, based on the height of the road surface; and
detecting a step on the road surface, based on a difference between an agreement degree of a height of a measurement point set in the travelable region relative to the curve and an agreement degree of a height of a measurement point set in an extended region, defined by extending the travelable region in the vehicle width direction, relative to the curve with which a gradient of the road surface in the extended region is approximated.

7. The step detection device according to claim 4, further comprising
a roadway information acquisition circuit that acquires information on a roadway on which the vehicle is travelling, wherein
the travelable region circuit sets a distance of the travelable region in the vehicle width direction based on the information on the roadway.

* * * * *